US00RE43485E

(19) United States
(12) Reissued Patent
Hargreaves et al.

(10) Patent Number: US RE43,485 E
(45) Date of Reissued Patent: Jun. 26, 2012

(54) KEYBOARD

(75) Inventors: William R. Hargreaves, Bellevue, WA (US); Drew Carlson, Richmond, VA (US); Mark S. Ando, Seattle, WA (US); Jerry Yamamoto, Seattle, WA (US); Jonathan H. Biggs, Lake Forest Park, WA (US); Carsten Buus, Snohomish, WA (US)

(73) Assignee: Kinesis Corporation, Bothell, WA (US)

(21) Appl. No.: 29/315,693

(22) Filed: Jul. 2, 2009

Related U.S. Patent Documents

Reissue of:
(64) Patent No.: Des. 585,063
Issued: Jan. 20, 2009
Appl. No.: 29/298,046
Filed: Nov. 27, 2007

(51) LOC (9) Cl. ..... 14-02
(52) U.S. Cl. ..... D14/393
(58) Field of Classification Search ..... D14/391–399; D18/1, 2, 6, 7; 200/5 A, 5 R, 6 A, 6 R; 235/145 A, 235/145 R; 178/17 A, 17 C; 341/22, 23; 345/160, 168, 169; 400/484–486, 488, 489, 400/492; 361/679.08–679.15
See application file for complete search history.

(56) References Cited

U.S. PATENT DOCUMENTS

| | | | | |
|---|---|---|---|---|
| 1,202,213 | A | 10/1916 | Patten | |
| 1,336,151 | A | 4/1920 | O'Connor | |
| 1,395,049 | A | 10/1921 | McNamara | |
| 1,589,193 | A | 6/1926 | Mathews | |
| 1,652,464 | A | 12/1927 | Tyberg | |
| 2,040,248 | A | 5/1936 | Dvorak et al. | 197/100 |
| 2,192,594 | A | 3/1940 | Brand et al. | 197/11 |
| 3,022,878 | A | 2/1962 | Seibel et al. | 197/19 |
| 3,663,733 | A | 5/1972 | Murakami | 84/1.01 |
| 3,805,939 | A | 4/1974 | Ross | 197/19 |
| 3,911,234 | A | 10/1975 | Kotaka | 200/5 A |
| 3,929,216 | A | 12/1975 | Einbinder | 197/100 |
| 3,940,758 | A | 2/1976 | Margolin | 340/337 |
| 3,945,482 | A | 3/1976 | Einbinder | 197/100 |
| 3,990,565 | A | 11/1976 | Felton et al. | 197/98 |
| 4,081,068 | A | 3/1978 | Zapp | 197/98 |
| 4,244,659 | A | 1/1981 | Malt | 400/486 |

(Continued)

FOREIGN PATENT DOCUMENTS

DE 1279693 9/1963

(Continued)

OTHER PUBLICATIONS

Conway, "Contoured Keyboard", *IBM Technical Disclosure Bulletin*, 22(3):1276-1277, Aug. 1979.

(Continued)

*Primary Examiner* — Freda Nunn
(74) *Attorney, Agent, or Firm* — Seed IP Law Group PLLC

(57) CLAIM

The ornamental design for a keyboard, as shown and described.

DESCRIPTION

FIG. 1 is a front perspective view of a keyboard showing our new design[.]*;*
FIG. 2 is a top plan view thereof[.]*;*
FIG. 3 is a bottom plan view thereof[.]*;*
FIG. 4 is a front elevation view thereof[.]*;*
FIG. 5 is a rear elevation view thereof[.]*;*
FIG. 6 is a left side elevation view thereof;
FIG. 7 is a right side elevation view thereof;
*FIG. 8 is a front perspective view of an alternate embodiment of the keyboard; and,*
*FIG. 9 is a top plan view of the alternate embodiment of the keyboard.*
The elements illustrated in broken lines in the drawing figures are considered environmental only and do not form a part of the claimed design.

1 Claim, 7 Drawing Sheets

Figure 3:
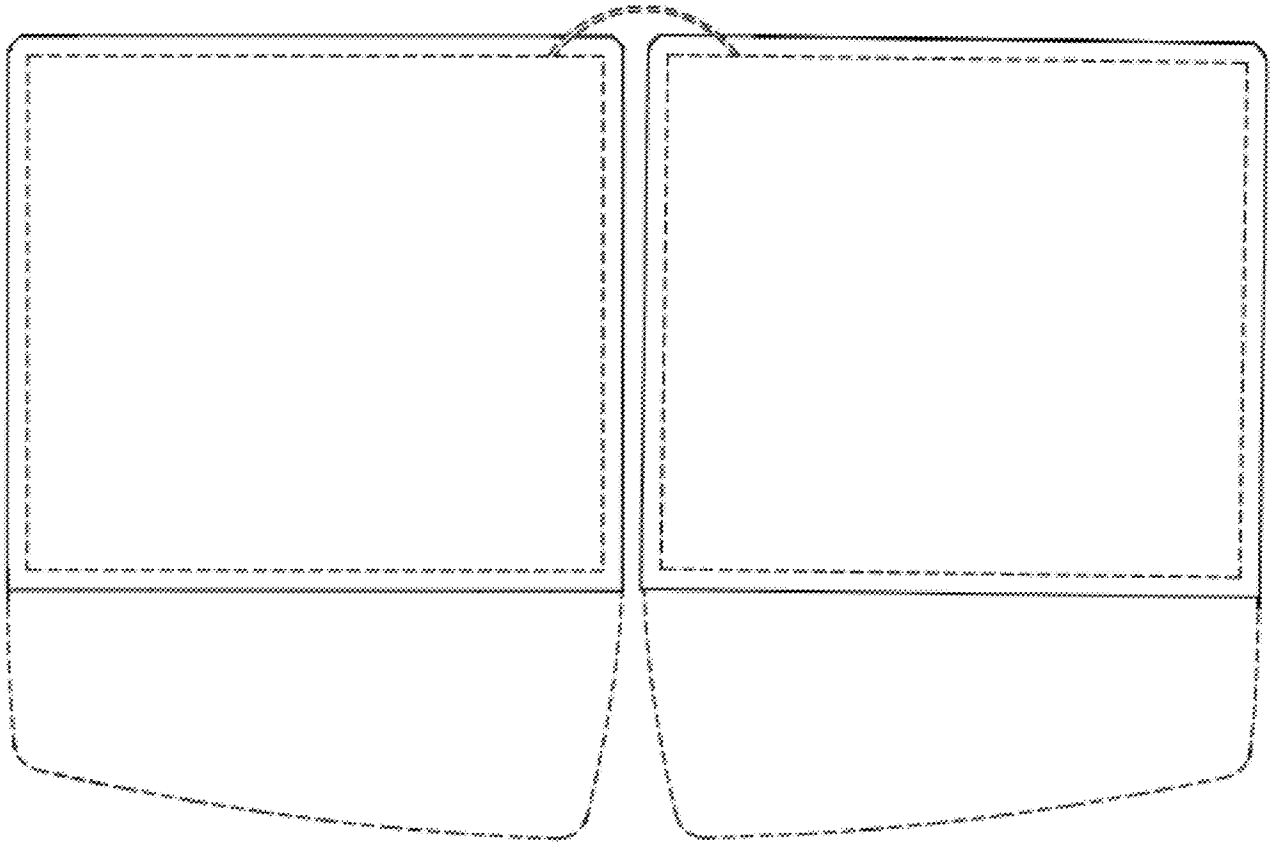
Figure 8:
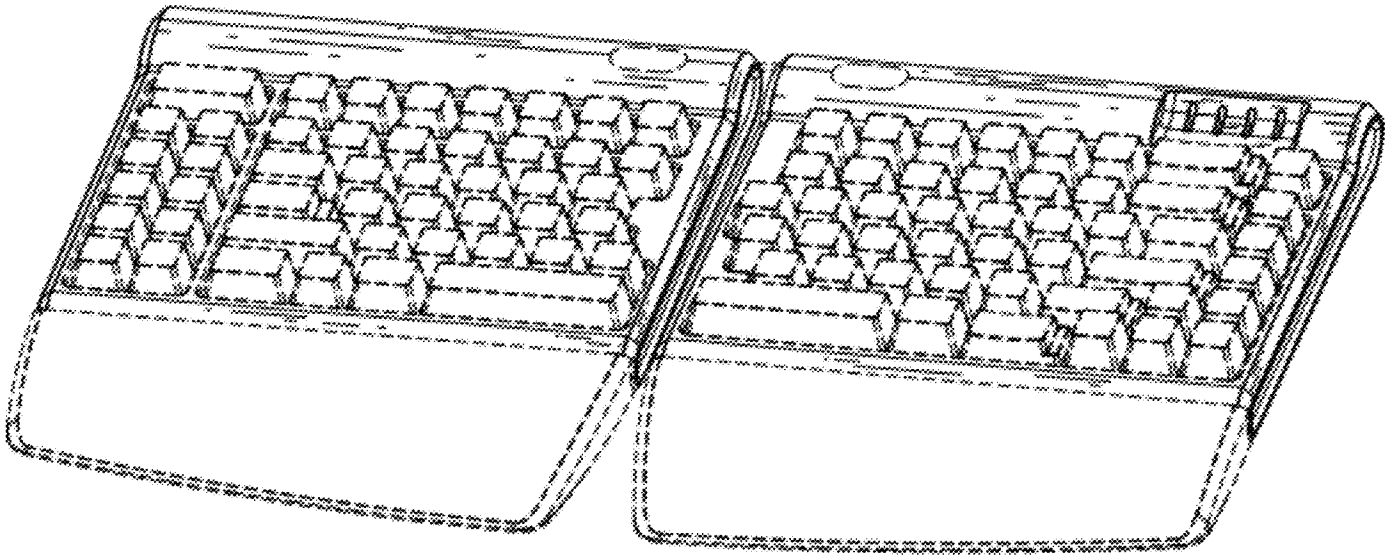
Figure 9:
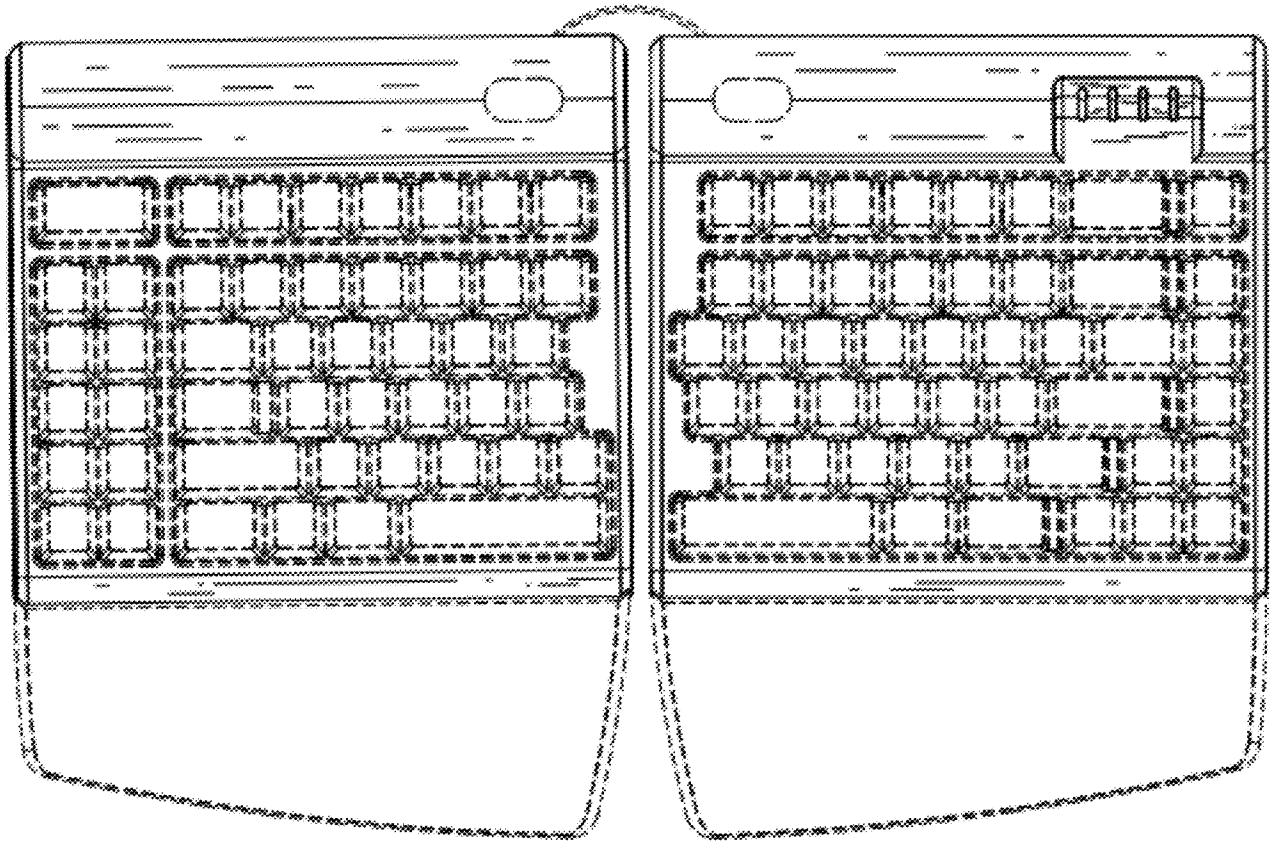

Matter enclosed in heavy brackets [ ] appears in the original patent but forms no part of this reissue; matter printed in italics indicates the additions made by reissue.

*(Amended)*

U.S. PATENT DOCUMENTS

| | | | | |
|---|---|---|---|---|
| 4,378,553 | A | 3/1983 | McCall | 340/365 R |
| 4,440,515 | A | 4/1984 | Nassimbene | 400/479 |
| 4,467,321 | A | 8/1984 | Volnak | 340/365 L |
| 4,493,992 | A | 1/1985 | Geller | 250/221 |
| 4,509,873 | A | 4/1985 | Ryan | 400/489 |
| 4,522,518 | A | 6/1985 | Schmidt | 400/486 |
| 4,575,591 | A | 3/1986 | Lugaresi | 200/6 A |
| 4,579,470 | A | 4/1986 | Casey | 400/489 |
| 4,597,681 | A | 7/1986 | Hodges | 400/488 |
| 4,613,247 | A | 9/1986 | McGunnigle | 400/486 |
| 4,615,629 | A | 10/1986 | Power | 400/486 |
| D287,854 | S | 1/1987 | Crews | D14/100 |
| 4,655,621 | A | 4/1987 | Holden | 400/100 |
| 4,661,005 | A | 4/1987 | Lahr | 400/489 |
| 4,679,030 | A | 7/1987 | Volnak | 340/365 A |
| 4,680,572 | A | 7/1987 | Meguire et al. | 340/365 R |
| 4,686,408 | A | 8/1987 | Ishiyama | 310/334 |
| 4,715,736 | A | 12/1987 | McGunnigle | 400/484 |
| 4,734,963 | A | 4/1988 | Ishiyama | 29/25.35 |
| 4,735,520 | A | 4/1988 | Suzuki et al. | 400/488 |
| 4,783,645 | A | 11/1988 | Goldwasser et al. | 340/365 R |
| 4,791,526 | A | 12/1988 | Breu et al. | 361/398 |
| 4,799,049 | A | 1/1989 | Avila | 340/709 |
| 4,824,268 | A | 4/1989 | Diernisse | 400/486 |
| 4,833,446 | A | 5/1989 | Eilam et al. | 341/22 |
| 4,836,700 | A | 6/1989 | Jensen | 400/489 |
| 4,897,649 | A | 1/1990 | Stucki | 341/22 |
| 4,913,573 | A | 4/1990 | Retter | 400/489 |
| 4,917,516 | A | 4/1990 | Retter | 400/489 |
| 4,920,342 | A | 4/1990 | Gratke | 341/22 |
| 4,949,080 | A | 8/1990 | Mikan | 340/711 |
| 4,974,183 | A | 11/1990 | Miller | 364/709.12 |
| 5,017,030 | A | 5/1991 | Crews | 400/485 |
| 5,021,771 | A | 6/1991 | Lachman | 340/709 |
| 5,044,053 | A | 9/1991 | Kopel et al. | 29/25.35 |
| 5,059,048 | A | 10/1991 | Sirkin | 400/486 |
| 5,067,834 | A | 11/1991 | Szmanda et al. | 400/489 |
| 5,073,050 | A | 12/1991 | Andrews | 400/82 |
| 5,091,771 | A | 2/1992 | Bolan et al. | 357/74 |
| 5,115,705 | A | 5/1992 | Monte et al. | 84/617 |
| 5,122,786 | A | 6/1992 | Rader | 340/711 |
| 5,126,723 | A | 6/1992 | Long et al. | 340/710 |
| 5,137,384 | A | 8/1992 | Spencer et al. | 400/489 |
| 5,148,152 | A | 9/1992 | Stueckle et al. | 340/706 |
| 5,156,475 | A | 10/1992 | Zilberman | 400/472 |
| 5,160,919 | A | 11/1992 | Mohler et al. | 340/711 |
| 5,164,712 | A | 11/1992 | Niitsuma | 340/706 |
| 5,228,791 | A | 7/1993 | Fort | 400/489 |
| D340,445 | S | 10/1993 | Marquardt et al. | D14/115 |
| 5,252,952 | A | 10/1993 | Frank et al. | 345/157 |
| D341,134 | S | 11/1993 | Marquardt et al. | D14/115 |
| 5,260,512 | A | 11/1993 | Chomette et al. | 84/644 |
| 5,269,004 | A | 12/1993 | Comerford et al. | 395/275 |
| 5,270,690 | A | 12/1993 | Oberg | 345/163 |
| D345,152 | S | 3/1994 | Mermod, Jr. | D14/115 |
| D346,376 | S | 4/1994 | Marquardt et al. | D14/115 |
| 5,322,967 | A | 6/1994 | Matsuda | 84/653 |
| D348,453 | S | 7/1994 | Riley et al. | D14/115 |
| D348,877 | S | 7/1994 | Lichtenberg | D14/115 |
| 5,334,997 | A | 8/1994 | Scallon | 345/167 |
| 5,351,066 | A | 9/1994 | Rucker et al. | 345/168 |
| 5,410,333 | A | 4/1995 | Conway | 345/169 |
| 5,424,728 | A | 6/1995 | Goldstein | 341/22 |
| 5,454,652 | A | 10/1995 | Huellemeier et al. | 400/489 |
| 5,457,452 | A | 10/1995 | Skovronski | 341/22 |
| D370,476 | S | 6/1996 | Dalesky | D14/115 |
| D370,669 | S | 6/1996 | Hargreaves et al. | D14/115 |
| 5,596,480 | A | 1/1997 | Manser et al. | 361/680 |
| 5,610,602 | A | 3/1997 | Hargreaves | 341/22 |
| 5,646,817 | A | 7/1997 | Manser et al. | 361/680 |
| 5,653,543 | A | 8/1997 | Abe | 400/489 |
| 5,673,040 | A | 9/1997 | Hargreaves et al. | 341/22 |
| D386,172 | S | 11/1997 | Kawauchi et al. | D14/115 |
| 5,689,253 | A | 11/1997 | Hargreaves et al. | 341/22 |
| 5,712,760 | A | 1/1998 | Coulon et al. | 361/680 |
| 5,734,548 | A * | 3/1998 | Park | 361/679.14 |
| 5,754,395 | A | 5/1998 | Hsu et al. | 361/680 |
| 5,769,551 | A | 6/1998 | Tsai et al. | 400/489 |
| 5,841,635 | A | 11/1998 | Sadler et al. | 361/749 |
| D408,804 | S | 4/1999 | Kurokawa et al. | D14/115 |
| 6,005,496 | A | 12/1999 | Hargreaves et al. | 341/22 |
| D420,655 | S | 2/2000 | Louis et al. | D14/115 |
| 6,046,731 | A | 4/2000 | Griffin et al. | 345/168 |
| 6,055,153 | A * | 4/2000 | Chiu et al. | 361/679.14 |
| 6,081,207 | A | 6/2000 | Batio | 341/20 |
| 6,190,068 | B1 | 2/2001 | Chao | 400/472 |
| 6,320,519 | B1 | 11/2001 | Hsu et al. | 341/23 |
| D470,493 | S | 2/2003 | Tritschler et al. | D14/393 |
| 6,594,142 | B2 | 7/2003 | Katz | 361/680 |
| 6,641,316 | B1 | 11/2003 | Goldstein et al. | 400/489 |
| 6,670,948 | B2 | 12/2003 | Zarek | 345/168 |
| 6,793,421 | B1 * | 9/2004 | Baldwin et al. | 400/488 |
| 6,883,984 | B2 | 4/2005 | McLoone et al. | 400/486 |
| 6,999,008 | B2 | 2/2006 | Wang et al. | 341/22 |
| 7,030,323 | B2 * | 4/2006 | Lahr | 200/5 A |
| 7,187,363 | B2 * | 3/2007 | Nguyen et al. | 345/168 |
| 2001/0033763 | A1 | 10/2001 | Goldstein et al. | 400/472 |
| 2005/0025549 | A1 | 2/2005 | McLoone | 400/472 |
| 2005/0025550 | A1 | 2/2005 | McLoone | 400/472 |
| 2005/0052832 | A1 | 3/2005 | Monney et al. | 361/680 |
| 2005/0088414 | A1 | 4/2005 | Adan et al. | 345/163 |
| 2005/0276651 | A1 | 12/2005 | McLoone et al. | 400/489 |
| 2007/0285395 | A1 | 12/2007 | Hargreaves et al. | 345/168 |

FOREIGN PATENT DOCUMENTS

| | | |
|---|---|---|
| GB | 1016993 | 1/1966 |
| GB | 2000083 | 1/1979 |
| GB | 2090561 | 7/1982 |
| GB | 2181096 | 4/1987 |
| JP | 44-024333 | 10/1969 |
| JP | 55-087225 | 7/1980 |
| JP | 62-022129 | 1/1987 |
| JP | 63-135612 | 6/1988 |
| JP | 64-018331 | 1/1989 |
| JP | 3215419 | 7/2001 |
| WO | WO89/06600 | 7/1989 |
| WO | WO92/09996 | 6/1992 |

OTHER PUBLICATIONS

Franklin et al., "Occupational Carpal Tunnel Syndrome in Washington State, 1984-1988," *Am. J. Public Health,* 81(6):741-746, Jun. 1991.

Goldtouch Adjustable Keyboard, SKU: GTU0077/GTU0033, Key Ovation LLC, 2004.

Goldtouch Adjustable Keyboard, SKU: GTC0077/GTC0033, Key Ovation LLC, 2004.

Hargreaves, et al. , "White Paper on Ergonomic Keyboards, I: Split Conventional Designs," Kinesis Corporation, pp. 1-5, Apr. 2001.

Heyer et al., University of Washington Study of Video Display Terminal Workers, *Appendices D, E & F,* 50 pages, Feb. 1989.

James, "Carpal Tunnel Syndrome," *Issues of Injury,* Medical Consultants Northwest, Inc., 1(1):1-6, May 1987.

"Maxim Adjustable Keyboard for PS/2 & USB", Brochure, Kinesis Corporation, 2 pages, 2005.

"PC Brand Computer" *advertisement from PC Magazine,* 8(2):178, 1989.

Rhodes, "Chord Keyboard", *IBM Technical Disclosure Bulletin,* 25(7A):3300-3302, Figures 1, 2 and 4, Dec. 1982.

"Safeskin" product advertisement from *PC Magazine,* 8(4):86, Feb. 1989.

Safety & Health Assessment and Research Program, "Cumulative Trauma Disorders in Claims Initiation, Baseline Findings", *Wash. Dept. L&I,* pp. 1-14 and 5 sheets of drawings Jan. 1991.

Snyder, *Ergonomic Principles in Office Automation,* Ericsson Information Systems AB, Sweden, "Keyboard Design," pp. 43-58, 1983.

"TDA Template" advertisement from *Personal Computing,* 13:2, 236-237, Dec. 1989.

Thompson et al., "Analysis of the Tony!™ Variable Geometry VDT Keyboard," *Proceedings of the Human Factors Society, 34th Annual Meeting,* pp. 365-369, 1990.

"Upper Limb Ergonomic Stressors in Selected Newspaper Jobs, A Pilot Study", *Univ. of Michigan and National Institute of Occupational Safety & Health,* 54 pages, May 1990.

"VersaPoint Micro Joystick Integration Guide", *Interlink Electronics,* 11 pages, Oct. 1993.
U.S. Appl. No. 11/342,286, filed Jan. 27, 2006, Hargreaves et al.
Hedges, "Reinventing the Keyboard: Hunt 'n' peck meets hi-tech," *The Times,* Sect. C:1-2, Monday, May 4, 1992.
Kroemer, "Human Engineering the Keyboard," *Human Factors,* 14(1):51-63, 1972.
Nakaseko et al., "Studies on Ergonomically Designed Alphanumeric Keyboards," *Human Factors,* 27(2):175-187, 1985.
Zipp et al., "Keyboard design through physiological strain measurements," *Applied Ergonomics,* 14.2:117-122, 1983.
*Key Ovation, LLC* v. *Kinesis Corporation,* Civil Action No. 1:09-CV-00144-SS, Report on the Filing or Determination of an Action Regarding a Patent or Trademark, dated Feb. 26, 2009.
*Key Ovation, LLC* v. *Kinesis Corporation,* Civil Action No. 1:09-CV-00144-SS, Amended Complaint for Declaratory Judgment, dated Jun. 2, 2009.

* cited by examiner

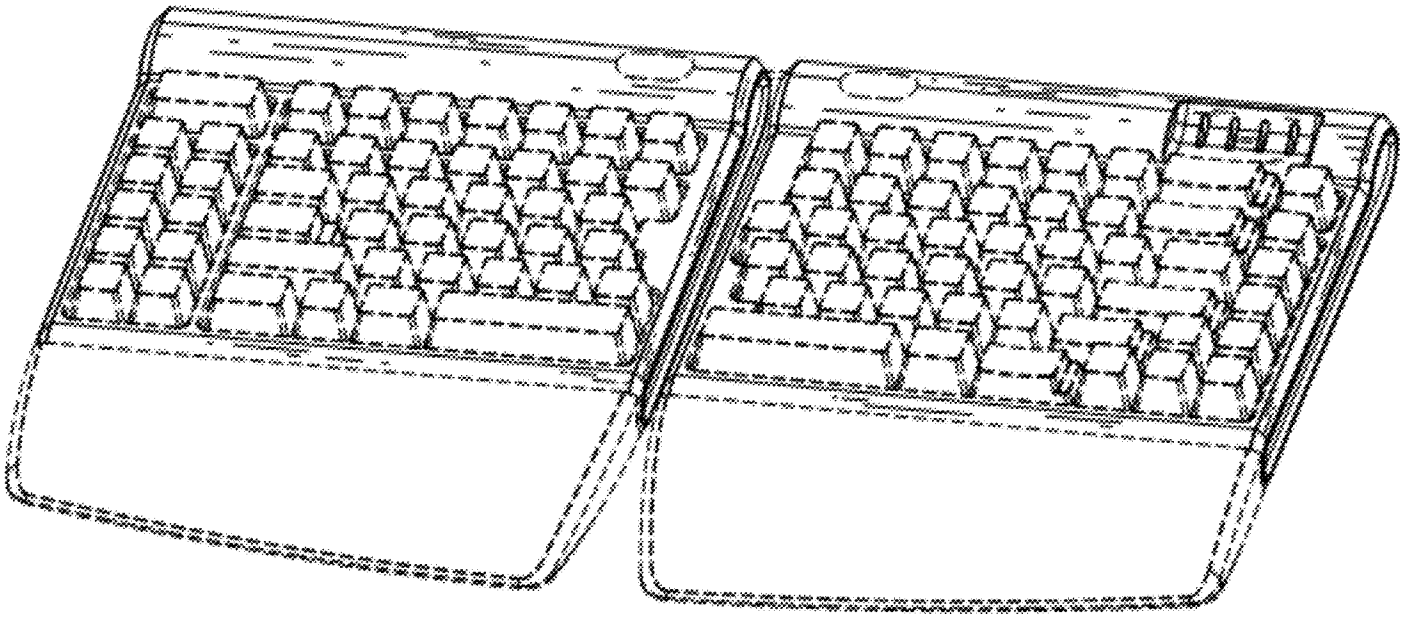
FIG. 1 (Amended)

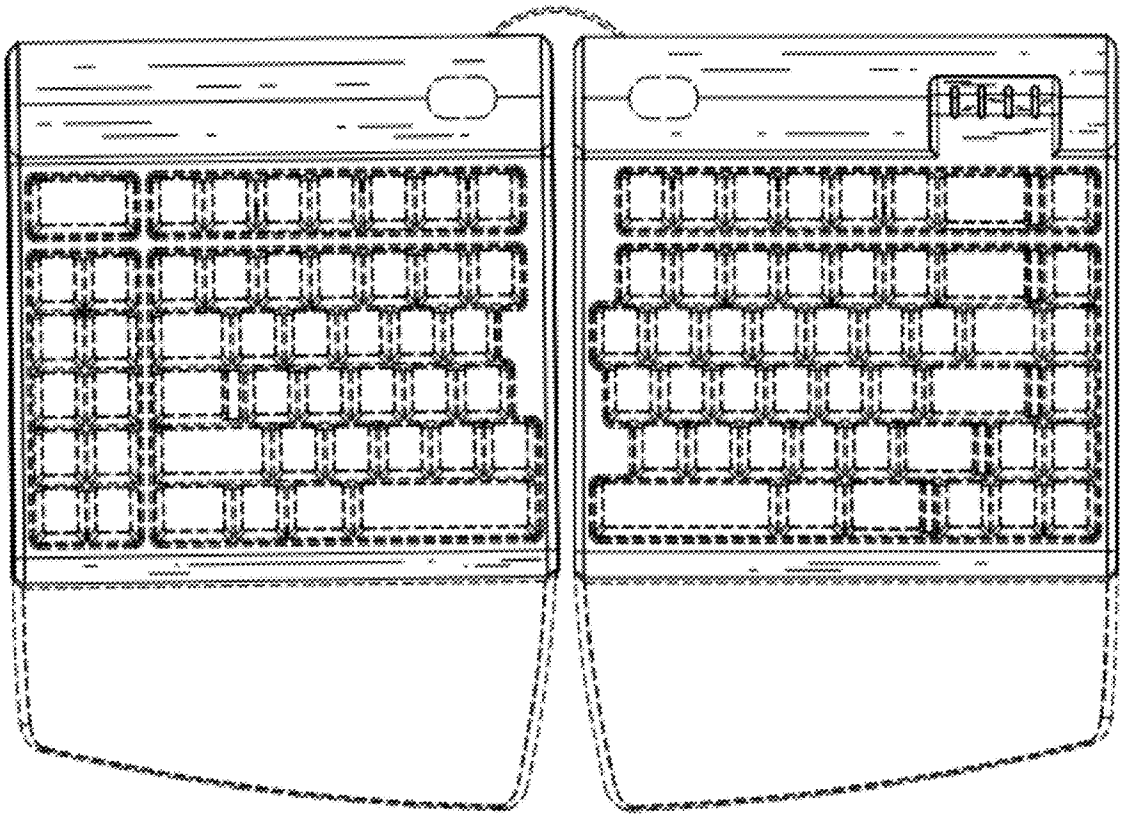
FIG. 2 (Amended)

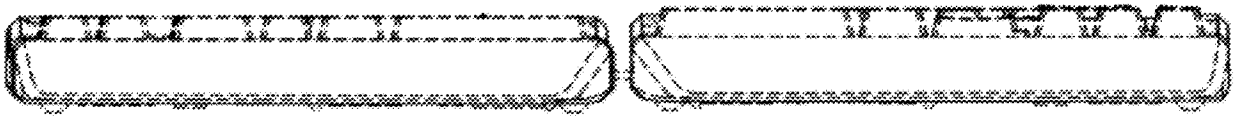
FIG. 4
(Amended)
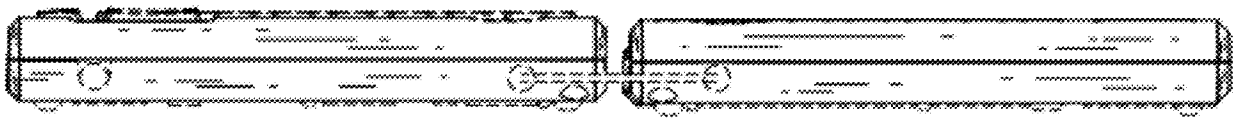
FIG. 5
(Amended)

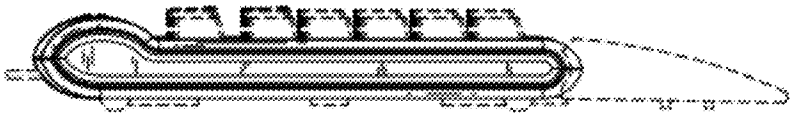
FIG. 6
(Amended)
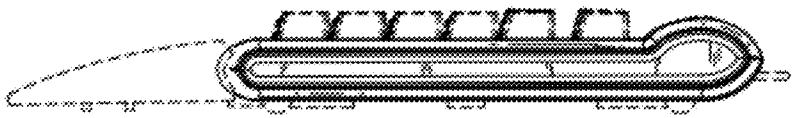
FIG. 7
(Amended)